June 18, 1957 W. P. OEHLER ET AL 2,796,013
LATERALLY SHIFTABLE AND SWIVELABLE DISK MOUNTING
Filed March 2, 1954 2 Sheets-Sheet 1
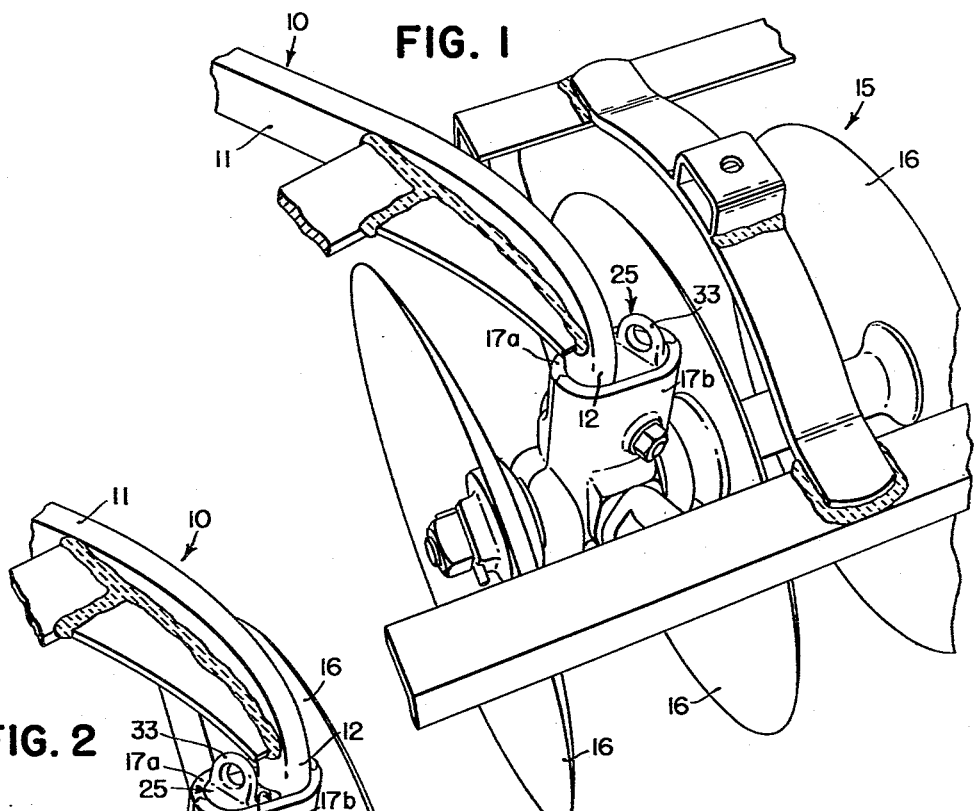
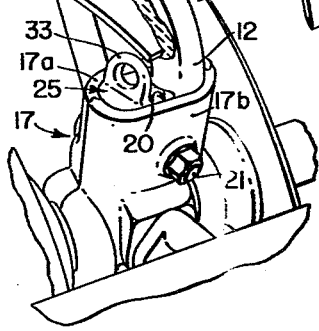
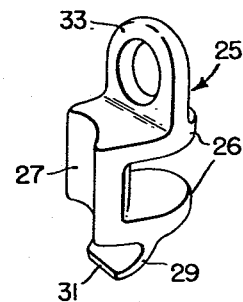
*INVENTORS.*
WILLIAM P. OEHLER
CHARLES H. YOUNGBERG
BY
*ATTORNEY*

United States Patent Office 2,796,013
Patented June 18, 1957

2,796,013

LATERALLY SHIFTABLE AND SWIVELABLE DISK MOUNTING

William P. Oehler and Charles H. Youngberg, Moline, Ill., assignors to Deere & Company, Moline, Ill., a corporation of Illinois Application March 2, 1954, Serial No. 413,625

1 Claim. (Cl. 97—198)

The present invention relates generally to agricultural implements and more particularly to disk harrows and the like.

The object and general nature of the present invention is the provision of a simple, convenient and inexpensive way of providing for lateral adjustment of the gangs of a disk harrow relative to the associated frame. It will be understood that certain field conditions or tractor speeds may make it desirable to provide for a lateral adjustment between the right- and left-hand gangs for the purpose of preventing the formation of a ridge or furrow between the gangs. In a double-action or tandem harrow, such lateral adjustment is usually made at the rear gangs.

More specifically, it is an important feature of this invention to provide for lateral adjustment of a disk harrow gang or the like relative to an associated frame, which adjustment means is in the nature of a two-position bearing socket carried by the gang and providing two positions of the associated frame part in the gang bearing socket, with a spacer or filler means insertable into and held in either side of the socket alongside the frame part to prevent the latter from shifting to the other side.

These and other objects and advantages of the present invention will be apparent to those skilled in the art after a consideration of the following detailed description of the preferred embodiment, illustrated by way of example in the accompanying drawings.

In the drawings:

Fig. 1 is a perspective view of a portion of a double-action disk harrow in which the principles of the present invention have been incorporated, the inner end of one of the rear gangs and the associated frame part being shown with the disk gang shown in its position of widest spacing between the rear gangs.

Fig. 2 is a fragmentary view similar to Fig. 1, showing the disk gang in its narrow setting.

Fig. 7 is a perspective view of the optionally positionable spacer.

Figure 3:
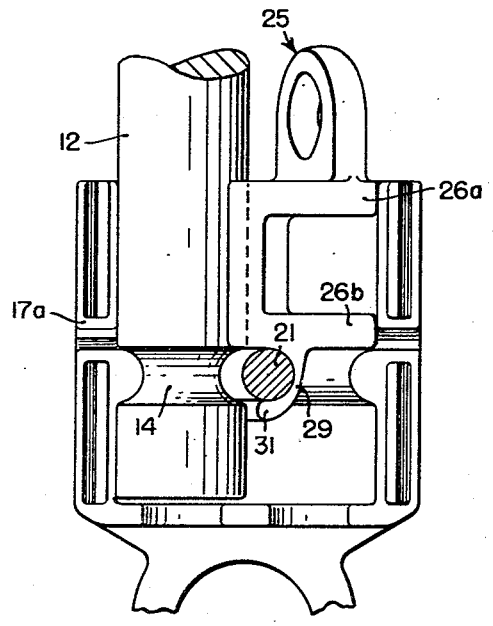
Fig. 3 is a generally vertical elevational view, with the rear half of the bearing yoke removed, and showing the parts in the same position as illustrated in Fig. 1.

The frame of the disk harrow is indicated by the reference numeral 10 and includes a pair of side bars 11, only one of which is shown in the drawings. Each side bar includes a downwardly extending leg section 12 having adjacent its lower end a continuous annular recess or groove 14. The rear gang associated with the frame bar 11 is indicated in its entirety by the reference numeral 15 and includes a gang or series of disks 16 interconnected by the usual gang bolt and spacing spools, the laterally inner one of which carries suitable bearing means to which is connected a bearing yoke 17. The upper portion of the bearing yoke 17, which is made up of two halves 17a and 17b that are substantially identical in the preferred construction, is provided with a generally oblong socket section 20. The associated frame leg section 12 may be disposed optionally at either one side or the other of the oblong socket 20, according to whether it is desired to have the rear gang operate at a narrow spacing or at a wider spacing. The two halves 17a and 17b of the bearing yoke 17 are held together by a clamping bolt 21 to which further reference will be made below.

When the frame leg 12 is disposed in either of its two optional positions, it is desirable to provide means disposed at the other side of the socket section 20 to engage the adjacent side of the frame leg section and to thereby complete the bearing contact between the frame leg and the bearing yoke. According to the principles of the present invention, we provide a spacer 25 of suitable form and shape so that whenever the frame leg is disposed at either side of the socket section 20, the spacer 25 is adapted to be disposed in the socket section 20 at the other side thereof, thereby not only completing the bearing contact with the frame leg but also holding the latter against displacement out of the desired position.

Figure 4:
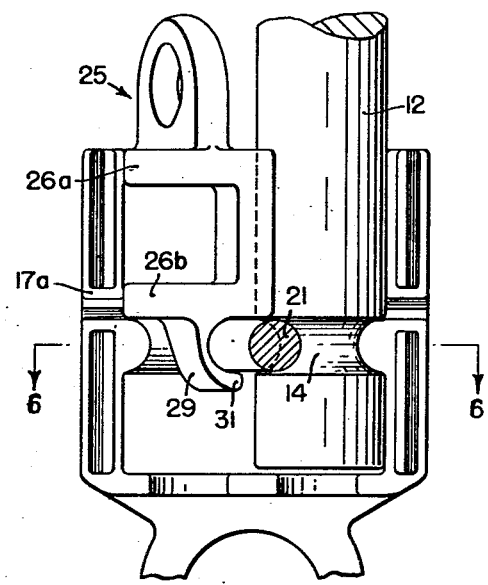
Fig. 4 is a view similar to Fig. 3, showing the parts in the positions they occupy in the narrow setting, as in Fig. 2.
Figure 5:
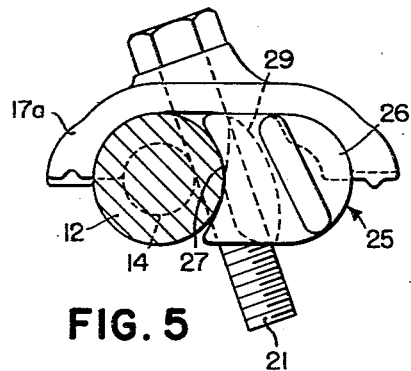
Fig. 5 is a top view of the arrangement shown in Fig. 3.
Figure 6:
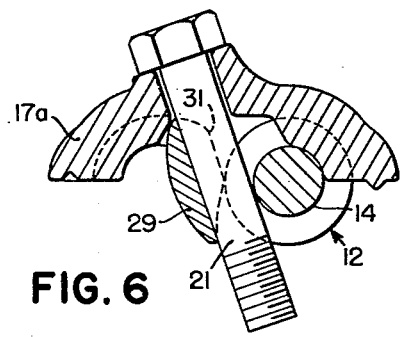
Fig. 6 is a sectional view taken generally along the line 6—6 of Fig. 4.

As best shown in Figs. 3–5, the spacer 25 is formed at one side with a convex surface 26 and at the other side with a concave surface 27, the former appearing in upper and lower portions 26a and 26b, Figs. 3 and 4. The surface 27 fits snugly against the adjacent side of the frame leg 12, with the clamping bolt 21 entering partially into the adjacent portion of the annular recess 14. According to the present invention, the clamping bolt 21 is also utilized to hold the spacer 25 in the proper position, and to this end, the lower portion of the spacer is extended, as at 29, to form a hook-like section having a portion 31 that is adapted to underlie the clamping bolt 21 when the spacer is in a position in the socket 20 at one side of the leg 12.

In operation, assuming that the disk gang is at the moment in its wider setting, Figs. 1 and 3, if it should be desired to have the rear gangs 15 operate at a narrow setting, all that it is necessary to do is to remove the bolt 21, lift out the spacer 25, move the gang 15 toward the inside of the harrow, and then assemble the frame leg 12 at the other side of the socket section 20, reinstall the spacer 25 at the laterally inner side of the frame leg 12, and then reinsert the bolt 21 and tighten. Thus, the bolt 21 not only holds the two halves of the bearing yoke together but, in addition, it retains the bearing leg 12 and the spacer 25 in position in the desired spacing. For convenience in handling, the spacer 25 is provided with a handle section 33.

The bolt 21 is shown as connecting the bearing yoke halves together with the bolt in a generally diagonal position, but, if desired, the bolt may be arranged so as to extend directly across from one yoke half to the other, the position of the bolt depending, at least in part, on the bolt diameter and the recess dimension, relative to the amount of shift of the frame leg with respect to the bearing yoke desired.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

In an agricultural implement, in combination, an elongated part substantially circular in section, a member having an oblong socket formed with rounded ends whereby said part may fit rotatably at either end of the socket, a spacer insertable in said socket alongside said part when in said socket at either one end or the other of the latter, said spacer having one portion formed as a concavity with a curvature that is rounded about the same as the curvature of said part and the opposite portion being formed as a convexity with a curvature that is about the same as the rounded ends of said oblong socket, whereby said spacer snugly holds said part in either end of said socket, said part having an annular groove approximately semicircular in section and the concave portion of said spacer having a semicircular notch adapted to register with said groove in either position of said part in said socket, and a retainer extending transversely of said socket and through said groove and notch to retain both said spacer and said part in said socket.

References Cited in the file of this patent

UNITED STATES PATENTS

| | | |
|---|---|---|
| 258,263 | Stroud | May 23, 1882 |
| 309,918 | Arnold et al. | Dec. 30, 1884 |
| 356,361 | Godfrey | Jan. 18, 1887 |
| 357,788 | Root et al. | Feb. 15, 1887 |
| 593,172 | Bailey | Nov. 2, 1897 |
| 999,516 | Noaker | Aug. 1, 1911 |
| 1,417,207 | Schutt | May 23, 1922 |
| 1,785,520 | Markert | Dec. 16, 1930 |
| 1,941,504 | White | Jan. 2, 1934 |
| 2,421,306 | White | May 27, 1947 |
| 2,652,274 | Weeks | Sept. 15, 1953 |